Oct. 19, 1948.  L. A. HARVEY  2,451,947
HAND-CARRIED MOTION PICTURE PROJECTING
AND VIEWING DEVICE
Filed April 4, 1946  2 Sheets-Sheet 1
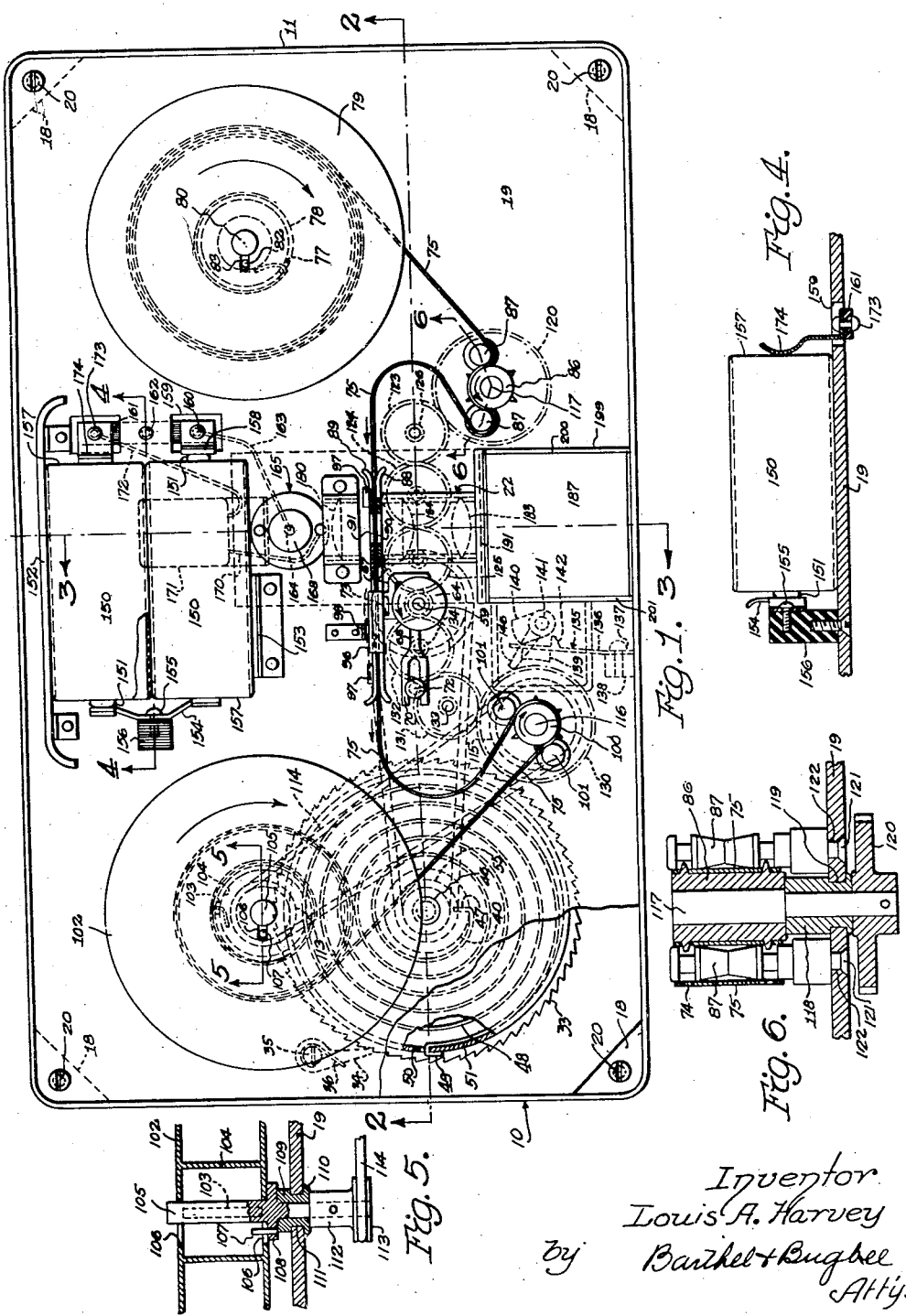
Inventor
Louis A. Harvey
by Barthel & Bugbee
Att'ys

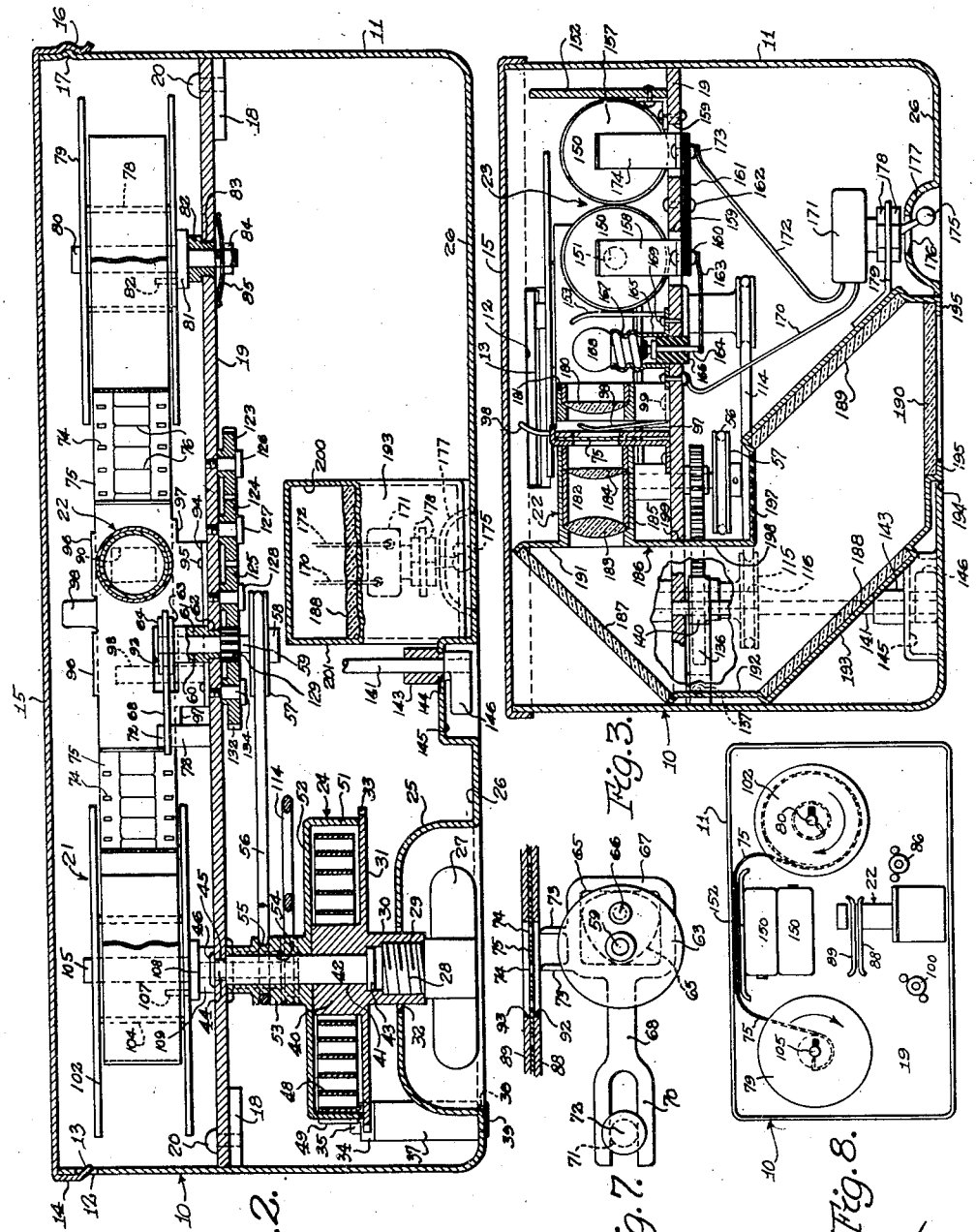

Patented Oct. 19, 1948

2,451,947

UNITED STATES PATENT OFFICE 2,451,947

HAND-CARRIED MOTION-PICTURE PROJECTING AND VIEWING DEVICE

Louis A. Harvey, Detroit, Mich.

Application April 4, 1946, Serial No. 659,631

2 Claims. (Cl. 88—24)

This invention relates to motion picture projectors and in particular to portable motion picture projectors.

One object of this invention is to provide a portable motion picture projector which is completely self-contained, including its screen, in a light-weight and compact assembly which can be carried in the hand.

Another object is to provide a self-contained motion picture projector and screen completely housed in a casing approximately the size and weight of a hand camera wherein the motion picture can be viewed at any time without any prior preparation other than loading the projector and winding a spring motor.

Another object is to provide a self-contained motion picture projector and screen capable of using the ordinary home-size motion picture film yet capable of being carried in one hand from place to place.

Another object is to provide a camera size motion picture projector as set forth in the preceding objects wherein the motion pictures can be viewed in daylight and even while walking or riding in a vehicle.

Another object is to provide a camera size motion picture projector wherein all elements for its functioning, including batteries for energizing the illumination and projecting system are self-contained within the box which houses the film, the take-up reel, the spring-actuated motor and the viewing screen.

Another object is to provide a portable motion picture projector as set forth in the preceding objects wherein the film is rewound after viewing merely by reversing the positions of the reels and turning them upside down so that the film, while being rewound traverses the rearward part of the projector without passing through the intermittent feed mechanism at the forward part of the projector.

Other objects and advantages of the invention will become apparent during the course of the following description of the accompanying drawings wherein:

Figure 1 is a top plan view partly broken away of a hand-carried, self-contained motion picture projector according to a preferred embodiment of the invention, with the cover removed to disclose the internal mechanism;

Figure 2 is a vertical section along the line 2—2 in Figure 1 showing the film-feeding and take-up mechanism;

Figure 3 is a vertical section at right angles to Figure 2, taken along the line 3—3 in Figure 1 and showing the optical projection system and screen;

Figure 4 is a vertical section along the line 4—4 in Figure 1 showing a portion of the electrical connections with the batteries;

Figure 5 is a fragmentary vertical section along the line 5—5 in Figure 1 showing the mechanism for driving the take-up reel;

Figure 6 is a fragmentary vertical section along the line 6—6 in Figure 1 showing the mechanism associated with one of the film feeding sprockets;

Figure 7 is a fragmentary enlarged top plan view, partly in section, of the intermittent film feeding mechanism shown in the center of Figure 1; and Figure 8 is a reduced diagrammatic top plan view similar to Figure 1 with certain parts omitted, showing the reels and film in the rewind positions thereof.

Referring to the drawings in detail, Figures 1, 2 and 3 show a preferred embodiment of the projector, generally designated 10 of this invention, as consisting of a box-like casing 11 having an aperture 12 at one end thereof for receiving the bent projections 13 on the edge flange 14 of a cover 15, the opposite edge flange of which is formed with an outwardly bent portion 16 mating with a corresponding projection 17 on the casing 11 to provide a detent for holding the cover 15 releasably in position. The casing 11 is provided with corner shelves 18 serving as support to which a platform 19 is secured as by fasteners 20. The platform 19 serves to support the film feeding and take-up mechanism, generally designated 21 (Figure 2), the optical projection and viewing system, generally designated 22, the illumination system generally designated 23 and the spring motor unit, generally designated 24.

Film feeding and winding mechanism

The spring motor unit 24 is in part housed in an inwardly recessed portion 25 (Figure 2) of the bottom wall 26 of the casing 11. The portion 25 contains a winding key 27 threaded as at 28 into a correspondingly threaded socket 29 in the hub 30 of a ratchet 31, the hub 30 passing through an aperture 32 in the wall of the recessed bottom portion 25. The ratchet 31 is provided with teeth 33 (Figure 1) engaged by a pawl 34 pivoted upon the pivot screw 35 and urged into engagement with the teeth 33 by a coil spring 36 encircling the pivot screw 35, both being mounted upon a post 37 (Figure 2) rising from the bottom wall 26 of the casing 11 and having a portion passing through an aperture 38 therein and secured thereto by being enlarged as at 39.

The hub 30 continues upwardly in a portion 40 having a central bore 41 through which passes the shank of a pivot stud 42 having a head 43 mounted at the end of the threaded bore 29. The upper end of the pivot stud 42 has a reduced diameter portion 44 passing through a hole 45 in the platform 19 and beyond this is enlarged as at 46 to secure it firmly in position. Secured as at 47 to a notch in the hub portion 40 (Figure 1) is the inner end of a coil spring 48, the outer hooked end 49 of which is anchored in a slot 50 in the cupped portion 51 of a housing disc 52. The disc 52 is attached to a hub 53 (Figure 2) having a bore 54 loosely and rotatably mounted on the pivot stud 42. The hub 53 is provided with a pully groove 55 which drivingly engages an endless belt 56, the opposite portion of which drivingly engages a pulley 57 having a hub 58 mounted upon a vertical shaft 59 journaled in the bore 60 of a bearing bushing 61 secured in the hole 62 in the platform 19. Mounted on the upper end of the shaft 59 is a pair of discs 63 and 64 having an approximately heart-shaped cam 65 pivotally supported therebetween by an eccentric pivot pin 66, the cam 65 also being bored to encircle the shaft 59 (Figure 7). The heart-shaped cam 65 is so designated for convenience and consciseness of description; more accurately, it has the outline of a spherical triangle.

Surrounding the heart-shaped cam 65 and slidably mounted between the discs 63 and 64 is the forward end 67 of an intermittent feed arm 68, the portion 67 having an approximately square opening 69 surrounding both the cam 65 and the shaft 59. The intermittent feed arm 68 at its rearward end is provided with a yoke portion 70 slidably and pivotally engaging an annular slot 71 (Figure 7) in a vertical post 72 mounted on the upper side of the platform 19. The inner edge of the forward portion 67 is provided with a pair of spaced pointed feed fingers 73 disposed at an interval corresponding to the interval between the perforations 74 of the film 75. Consequently, when the shaft 59 is rotated by the belt 56 from the spring motor 24, the intermittent feed arm 68 is oscillated by the rotation of the cam 65 through the action of the eccentric pivot pin 66, causing the filmfeeding fingers to enter the film perforations 74 and advance the film 75 one frame per revolution, after which the fingers 73 are retracted from the perforations 74 and the film 75 momentarily remains stationary.

The film 75 is a conventional type having the usual frames 76 (Figure 2), and one end thereof is releasably attached to a slot 77 in the hub 78 of a spool or reel 79. The reel 79 is rotatably mounted upon a shaft 80 having an enlarged portion 81 at the bottom thereof with a pin 82 extending upwardly into a slot 83 (Figure 1) of the film reel 79. The shaft 80 at its lower portion is journaled in a bushing 82 mounted in a hole 83 in the platform 19. The shaft 80 at its lower end carries an enlargement, such as a nut 84 which serves to retain a spring friction disc 85 and hold it in yielding engagement with the lower side of the platform 19. In consequence of this construction, the reel 79 is frictionally held against free rotation but is permitted to rotate as the film 75 is unwound from it, thereby preventing overrunning of the reel 79.

The film 75 is unwound from the reel 79 by means of a sprocket 86 (Figure 1) and is guided to and from the sprocket 86 by guide pins 87 (Figure 6) mounted on opposite sides of the sprocket 86, the teeth of which enter the perforations 74 of the film 75. Beyond the sprocket 86, the film 75 forms the usual loop before passing between the separable film guides 88 and 89 (Figure 1), these having aligned apertures 90 and 91, respectively, for the passage of the rays of the projection system. The film guides 88 and 89 are also provided with similarly aligned elongated apertures 92 and 93 (Figure 7) for the passage of the filmfeeding fingers 73. The film guide 88 is flanged as at 94 and secured by the fasteners 95 to the platform 19 (Figure 2), and at its upper and lower edges is provided with laterally projecting bent-over portions 96 and 97 engaging and guiding the upper and lower edges respectively of the film guide 89. The latter is yieldingly urged into engagement with film 75 by an L-shaped upstanding finger 98 secured as at 99 to the platform 19.

Beyond the film guides 88 and 89, the film 75 again passes through a loop into a second sprocket 100 and is guided on opposite sides thereof by pins 101 similar to the pins 87 already described (Figure 6). Beyond the sprocket 100, the film passes onto a take-up reel 102 similar in every respect to the reel 79 and having the end of the film 75 similarly and releasably hooked into a slot 103 in the hub 104 thereof. The take-up reel 102 is mounted upon a vertical shaft 105 and has a slot 106 drivingly engaged by a pin 107 (Figure 5) mounted on the enlarged portion 108 of the shaft 105. The lower portion of the shaft 105 is journaled in the bearing bushing 109 secured as at 110 in the hole 111 in the platform 19. Pinned or otherwise secured to the lower end of the shaft 105 is the hub 112 of the pulley 113. The latter is driven by an endless belt 114 from a pully 115 (Figure 3) mounted on the lower end of te drive shaft 116 of the sprocket 100.

The sprocket 86 is similarly mounted upon a drive shaft 117 (Figure 6) journaled in a bearing bushing 118 secured in a hole 119 in the platform 19 and having a gear 120 pinned or otherwise drivingly mounted on the lower end thereof. The guide pins 87 at their lower ends are secured as at 121 in holes 122 in the platform 19 adjacent the bearing bushing 118. The gear 120 meshes with a train of idler gears 123, 124 and 125 (Figure 2) respectively mounted upon threaded studs 126, 127 and 128, the upper ends of which are threaded into the platform 19. The gear 125 meshes with and is driven from a pinion 129 mounted upon the shaft 59 and hence driven by the belt 56 and pulley 57 from the spring motor 24.

The sprocket shaft 116 and sprocket 100 are similar to the construction shown in Figure 6 except that the pulley 115 is mounted upon the drive shaft 116 below a gear 130 which is substituted for the gear 120 of Figure 6. The gear 130 meshes with and is driven by a train of gears 131 and 132 (Figure 1) mounted upon studs 133 and 134 threaded into the platform 19 in a manner similar to the studs 126, 127 and 128 (Figure 2). The gear 132 likewise meshes with the pinion 129 on the shaft 59 and is thereby driven from the latter in a manner similar to the gear 125.

To provide for braking the gear 130 so as to prevent unwinding of the spring motor 24 when the reels 79 and 102 are being shifted for rewinding purposes, a brake, generally designated 135 is provided (Figure 1). This consists of a spring arm 136 secured by the fasteners 137 to a block 138 mounted on the inner front wall of the casing 11 and carrying a brake shoe 139 at its outer end, the brake shoe being curved to fit the periphery of the gear 130. A cam 140 mounted on a vertical shaft 141 urges the arm 136 and therefore the brake shoe 139 into engagement with the gear 130 and is limited in its movement by a stop 142 mounted on the brake arm 136. The shaft 141 is journaled in a bearing bushing 143 secured in the hole 144 of the recessed wall 145 struck inwardly from the bottom wall 26 of the casing 11 (Figure 2) and carries on its lower end an actuating arm or handle 146 operable by the fingers of the operator.

Projection and illumination system

The projection and illumination systems 22 and 23 are mounted in the central portion of the casing 11 and are shown in Figure 3. Electrical energy for illumination is provided by a pair of dry cells 150 or any other suitable dry battery. The dry cells 150 shown (Figures 1 and 3) are of the type employed in flashlight batteries and are placed with their central electrodes 151 disposed in opposite directions. The batteries 150 are held between retaining members 152 and 153 secured to the platform 19, the member 153 being a spring member adapted to urge the batteries 150 toward the member 152. One electrode 151 of one battery 150 is engaged by one end of a spring bridging contact member 154 (Figure 1) secured by the fastener 155 to the post 156 of insulating material rising from and secured to the platform 19. The opposite end of the bridging contact member 154 engages the end of the metallic casing 157 of the other battery 150. The remaining central electrode 151 is engaged by a spring contact finger 158 (Figures 1 and 3) which passes through an aperture 159 in the platform 19 and is secured by the fastener 160 to an insulating bridge 161 secured as at 162 to the underside of the platform 19.

A conductor 163 extends from the fastener 160 to the central contact 164 of a lamp socket 165, and is insulated by a plug 166 from the platform 19. The outer shell 167 of the lamp socket 165 is screw-threaded (or, if desired, provided with a bayonet type socket) to receive an electric light bulb 168, the central contact of which engages the contact 164. The shell 167 is secured by fasteners 169 to the platform 19 and a conductor 170 runs therefrom to a switch 171 from which a conductor 172 runs to a fastener 173 securing a spring finger 174 (Figure 4) to the insulating bridge 161. The spring finger 174 engages the end of the outer battery casing 150, completing the connection of the batteries 150 in series. The switch 171 is provided with an operating lever 175 extending through an aperture 176 in the wall of an inwardly recessed portion 177 in the bottom wall 26 of the casing 11. The switch 171 is secured by the nuts 178 threaded thereon to a bracket 179 supported as described below on one of the mirror supports.

The electric light bulb 168 is of a concentrated filament or approximately point filament type suitable for projection purposes, certain flashlight bulbs being satisfactory for this use. When the switch 171 is closed by operating the lever 175, the light bulb 168 is energized and gives forth light.

The light from the projection bulb 168 passes through a condensing lens 180 (Figure 3) mounted in a cell 181 supported upon the platform 19. The light collected by the condensing lens 180 passes through the frames 76 of the film 75, illuminating these as they pass in front of the apertures 90 and 91. The rays from the film pictures or frames 76 are projected by a projection lens system 182 consisting of lenses 183 and 184 mounted in a cell 185 which in turn is supported by a housing 186. The projection lens system 182 forms a part of the projection and illumination system 22. The rays from the projection lens system 182 are reflected by 45 degree mirrors 187, 188 and 189 onto a suitable translucent viewing screen 190, such as a fine ground glass screen, the focus of the projection lens system 182 being adjusted until a sharp image is obtained. The mirror 187 is supported at its upper end by an extension 191 of the housing 186 and its lower end is supported by an extension 192 rising from the mirror bracket portion 193 carrying the mirror 188. The lower end of the mirror bracket portion 193 is secured in an aperture 194 in the bottom wall 26 of the casing 11, and has offset portions 195 for receiving the viewing screen 190. The mirror bracket portion 193 on the opposite side of the viewing screen 190 is extended upward as at 196 to receive the mirror 189 and beyond this is provided with a horizontal portion 197 joining with a vertical portion 198 secured to the platform 19. Thus, the portions 191, 192, 193, 196, 197 and 198 together make up the box-like housing 186, the upper portion of which extends through a rectangular opening 199 in the platform 19 (Figure 1) and has attached thereto the cell or lens barrel 185 of the projection lens system 182. The upright portion 198 of the housing 186 is attached, together with the side walls 200 and 201 of the housing 186 to the platform 19. The above-described structure for supporting the projection lens system 182, the mirrors 187, 188 and 189 and the viewing screen 190 are shown diagrammatically and not in detail because it is obvious that in practice such optical systems and their mountings are constructed in a variety of ways to obtain the optical arrangement necessary. The mirrors 187, 188 and 189 may be front silvered or rear silvered, as desired, the front-silvered form giving a clearer image free from ghost images by multiple reflection but being less durable than the rear-silvered mirror. The term "silvered" is used to embrace surfaces other than metallic silver, for example metallic aluminum and other such reflecting coatings well-known in the optical art.

Operation of the invention

In the operation of the invention, the cover 15 is removed by lifting up on the detent edge portion 16 (Figure 2). A pair of batteries 150 are then inserted as shown in Figure 1 with their central electrodes 151 facing in opposite directions and engaging the respective contact members 154 and 158, the bottom ends of the battery casings engaging the spring fingers 174 and the opposite end of the contact member 154. The batteries 150 are then connected in series to supply their maximum voltage to the illumination bulb 168 which is inserted in the socket 165. A reel 79 with standard film thereon is then mounted on the shaft 80 with the pin 82 in the slot 83. The end of the film 75 is then withdrawn for about a foot of length and threaded over the sprocket 86 and around the guide pins 87, then between the film guides 88 and 89, the latter being pulled rearwardly to insert the film, a loop being left at both ends of these film guides. The film is then threaded over the sprocket 100 and between the guide pins 101 and the free end is then inserted in the slot 103 in the take-up reel 102 (Figure 1) and rotated a few turns to anchor it in position until the pin 107 enters the slot 106 as the reel 102 is inserted upon the shaft 105. Assuming that the projection lens system 182 has been properly focussed upon the focussing screen 190, and the spring motor 24 has been wound by turning the key 27, the projector is ready for use.

To start the projector, the lever 175 of the switch 171 is shifted to close the illuminating circuit and illuminate the projection bulb 168. The brake handle 146 is then rotated to release the brake shoe 139 from the gear 130 (Figure 1). This releases the mechanism actuated by the spring motor 24, whereupon the belt 56 (Figure 2) drives the pulley 57 on the intermittent feed shaft 59 (Figure 7) causing the intermittent feed arm 68 to oscillate in response to the action of the cam 65, causing the pointed fingers 73 intermittently to enter the film perforations 74 and advance the film 75 frame by frame with a short halt between each advancement step. Meanwhile, the sprockets 100 and 86 are rotated by their connection with the intermittent feed shaft 59 through the trains of gears previously described causing the film 75 to be unwound from the reel 79 and intermittently advance past the aligned apertures 90 and 91 through which the light from the projection bulb 168 is passing. The image of each frame 76 is projected by the projection lens system 182 and reflected successively from the mirrors 187, 188 and 189 onto the translucent viewing screen 190 where the motion picture is viewed by the observer. Meanwhile, the belt 114 from the pulley 115 mounted on the lower end of the sprocket shaft 116 drives the take-up reel 102 and winds the film thereon after viewing.

When all of the film has been viewed and wound on the take-up reel 102, the latter and the reel 79 are removed from their respective shafts 105 and 80, turned upside down and interchanged as shown in Figure 8. The film 75 is then threaded over the member 152 and attached at its free end to the notch 77 in the empty reel 79, which now becomes the take-up reel. The spring motor 24 is now operated by releasing the lever 146 of the brake 135, whereupon the reel 79 is rotated in the direction shown by the arrow in Figure 8 to rewind the film.

After the film has been rewound, the now full reel 79 and the empty reel 102 are again removed from the shafts 105 and 80, are again inverted, and are then placed in their original positions as shown in Figure 1. The film 75 is then rethreaded around the sprockets 86 and 100 and through the film guides 88 and 89 in the manner previously described, leaving the loops as shown in Figure 1. The free end of the film is then again hooked into the notch 103 of the take-up reel 102 and the projector is again ready for use. Obviously, after rewinding the film upon the reel 79, a different reel with a different picture may be substituted therefor and exhibited in the previously described manner. While rewinding is being accomplished, the illumination switch 171 is of course opened by shifting the hand lever 175 so as to de-energize the projection bulb 168.

The preferred embodiment of the present invention has been described and illustrated in connection with the film commonly known as 16-mm. film with perforations along both edges thereof. It will be understood, however, that the device, by minor and obvious modifications in the film holding and feeding devices, may be adapted to accommodate and utilize the so-called 8-mm. film having perforations along a single edge thereof, thereby still further reducing the size of the apparatus to the approximate dimensions of a hand camera and even to a size of casing which may be carried in a coat pocket.

The compactness of the present invention enables it to be carried on outings or in a motor car, train, air plane, or boat, and operated while such means of transportation is in motion. It can also be used at the beach, in the woods, and in other places where electricity is not available, because it carries its own batteries and is completely self-contained, even to containing its own screen.

While I have shown and described my invention in detail, it is to be understood that the same is to be limited only by the appended claims, for many changes may be made without departing from the spirit and scope of my invention.

What I claim is:

1. A self-contained hand-carried apparatus for projecting and viewing motion picture film comprising a casing including a partition dividing the interior thereof into upper and lower compartments, an electric battery carried by said casing, a film illuminator including an electric projection lamp centrally mounted on said partition and electrically connected to said electric battery, a film feeder adjacent said lamp, a pair of laterally spaced film spool shafts rotatably mounted in said casing on opposite sides of said lamp and extending through said partition an image screen carried by said casing, a lens system adapted to project an image of said film onto said screen, a plurality of sequentially disposed reflectors positioned between said lens system and said screen, and a spring-actuated motor mounted in said lower compartment and operatively connected to said film feeder and to one of said shafts.

2. A self-contained hand-carried apparatus for projecting and viewing motion picture film comprising a casing including a partition dividing the interior thereof into upper and lower compartments, an electric battery carried by said casing, a film illuminator including an electric projection lamp centrally mounted on said partition and electrically connected to said electric battery, a film feeder adjacent said lamp, a pair of laterally spaced film spool shafts rotatably mounted in said casing on opposite sides of said lamp and extending through said partition an image screen carried by said casing, a lens system adapted to project an image of said film onto said screen, a plurality of sequentially disposed reflectors positioned between said lens system and said screen, and a spring-actuated motor mounted in said lower compartment and operatively connected to said film feeder and to one of said shafts, said film illuminator being spaced away from the adjacent wall of said casing to provide a film rewind passageway therebetween communicating with the film spools on said shafts.

LOUIS A. HARVEY.

REFERENCES CITED

The following references are of record in the file of this patent:

UNITED STATES PATENTS

| Number | Name | Date |
|---|---|---|
| 410,135 | Bruckner et al. | Aug. 27, 1889 |
| 528,140 | Blackmore | Oct. 30, 1894 |
| 1,551,259 | Merriman | Aug. 25, 1925 |
| 1,703,945 | Meissner | Mar. 5, 1929 |
| 1,940,151 | Serrurier | Dec. 19, 1933 |
| 2,284,150 | Kemna | May 26, 1942 |
| 2,381,997 | Bolsey | Aug. 14, 1945 |